(12) United States Patent
Kim et al.

(10) Patent No.: US 12,214,363 B2
(45) Date of Patent: Feb. 4, 2025

(54) METHOD FOR SEPARATING FINE PARTICLES IN SOIL USING CATIONIC MAGNETIC NANOPARTICLES

(71) Applicant: KOREA ATOMIC ENERGY RESEARCH INSTITUTE, Daejeon (KR)

(72) Inventors: Il Gook Kim, Daejeon (KR); Chan Woo Park, Uiwang-si (KR); Hee Man Yang, Daejeon (KR); Kune Woo Lee, Daejeon (KR); In Ho Yoon, Daejeon (KR); Bum Kyoung Seo, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 791 days.

(21) Appl. No.: 17/277,630

(22) PCT Filed: Sep. 18, 2019

(86) PCT No.: PCT/KR2019/012032
§ 371 (c)(1),
(2) Date: Mar. 18, 2021

(87) PCT Pub. No.: WO2020/060171
PCT Pub. Date: Mar. 26, 2020

(65) Prior Publication Data
US 2021/0346894 A1 Nov. 11, 2021

(30) Foreign Application Priority Data

Sep. 18, 2018 (KR) .................. 10-2018-0111833
Sep. 4, 2019 (KR) .................. 10-2019-0109545

(51) Int. Cl.
| | | |
|---|---|---|
| *B03C 1/30* | (2006.01) | |
| *B03C 1/033* | (2006.01) | |
| *B03C 1/28* | (2006.01) | |
| *B03C 7/02* | (2006.01) | |
| *B09C 1/00* | (2006.01) | |
| *C08K 3/22* | (2006.01) | |
| *C08K 9/10* | (2006.01) | |
| *C08L 79/02* | (2006.01) | |
| *G21F 9/00* | (2006.01) | |
| *H01F 1/34* | (2006.01) | |
| *B82Y 25/00* | (2011.01) | |
| *B82Y 30/00* | (2011.01) | |
| *B82Y 40/00* | (2011.01) | |

(52) U.S. Cl.
CPC ............. *B03C 1/30* (2013.01); *B03C 1/0332* (2013.01); *B03C 1/288* (2013.01); *B03C 7/02* (2013.01); *B09C 1/00* (2013.01); *C08K 3/22* (2013.01); *C08K 9/10* (2013.01); *C08L 79/02* (2013.01); *G21F 9/00* (2013.01); *H01F 1/342* (2013.01); *B03C 2201/20* (2013.01); *B82Y 25/00* (2013.01); *B82Y 30/00* (2013.01); *B82Y 40/00* (2013.01); *C08K 2201/011* (2013.01)

(58) Field of Classification Search
CPC ......... B03C 1/30; B03C 1/0332; B03C 1/288; B03C 7/02; B03C 2201/20; B09C 1/00; C08K 3/22; C08K 9/10; C08K 2201/011; C08L 79/02; G21F 9/00; H01F 1/342; B82Y 25/00; B82Y 30/00; B82Y 40/00
USPC .......................................................... 588/17
See application file for complete search history.

(56) References Cited

U.S. PATENT DOCUMENTS

| | | | |
|---|---|---|---|
| 2010/0222501 A1 | 9/2010 | Murthy et al. | |
| 2015/0368126 A1* | 12/2015 | Predescu ................. | B03C 1/288 |
| | | | 210/695 |

FOREIGN PATENT DOCUMENTS

| | | |
|---|---|---|
| JP | 2003-275758 A | 9/2003 |
| JP | 2004-130199 A | 4/2004 |
| JP | 2006-102675 A | 4/2006 |
| JP | 2014-133203 A | 7/2014 |
| JP | 2014-181971 A | 9/2014 |
| JP | 2014-206469 A | 10/2014 |
| JP | 2016-19976 A | 2/2016 |
| KR | 10-2013-0127415 A | 11/2013 |
| KR | 10-1473314 B1 | 12/2014 |
| KR | 10-2016-0053565 A | 5/2016 |
| KR | 10-2016-0089208 A | 7/2016 |
| KR | 10-1678860 B1 | 12/2016 |
| WO | 2012/008032 A1 | 1/2012 |

OTHER PUBLICATIONS

International Search Report issued Dec. 30, 2019, corresponding to International Application No. PCT/KR2019/012032 citing the above reference(s).
Japanese Office Action dated Apr. 12, 2022 for corresponding Japanese Patent Application No. 2021-515009.

* cited by examiner

*Primary Examiner* — Edward M Johnson
(74) *Attorney, Agent, or Firm* — Hauptman Ham, LLP

(57) ABSTRACT

A method of separating fine particles (clay, silt, etc.) that have adsorbed contaminants such as heavy metals or radioactive nuclides in soil using cationic magnetic nanoparticles. According to the method, contaminants such as heavy metals or radioactive nuclides selectively or irreversibly adsorbed to fine particles (clay, silt, etc.) in soil may be economically and efficiently separated. Therefore, the method may be effectively used to restore soil in residential areas that are contaminated with radioactive nuclides in serious accidents such as the Fukushima Daiichi nuclear disaster as well as facility sites contaminated with heavy metals or radioactive nuclides.

9 Claims, 10 Drawing Sheets

METHOD FOR SEPARATING FINE PARTICLES IN SOIL USING CATIONIC MAGNETIC NANOPARTICLES

CROSS-REFERENCE TO RELATED APPLICATION

The present application is a national stage filing under 35 U.S.C § 371 of PCT application number PCT/KR2019/012032 filed on Sep. 18, 2019, which is based upon and claims the benefit of priorities to Korean Patent Application No. 10-2018-0111833, filed on Sep. 18, 2018, and Korean Patent Application No. 10-2019-0109545, filed on Sep. 4, 2019, in the Korean Intellectual Property Office. The disclosures of the above-listed applications are hereby incorporated by reference herein in their entireties.

TECHNICAL FIELD

The present invention relates to a method of separating fine particles in soil using cationic magnetic nanoparticles, and more particularly, to a method of separating fine particles (clay, silt, etc.) that have adsorbed contaminants such as heavy metals or radioactive nuclides in soil using cationic magnetic nanoparticles.

BACKGROUND ART

In Korea, since 1995 when the Soil Environment Conservation Act was enacted, as a result of investigating sites expected to be contaminated such as factories, industrial complexes and abandoned mines, it has been reported that soil contamination caused by heavy metals such as arsenic, cadmium, copper and lead is serious. In addition, according to previous cases abroad, the possibility of soil contamination by radioactive nuclides such as cesium and cobalt has emerged even at dismantled domestic nuclear power plant sites. Generally, as techniques for purifying soil contaminated by such heavy metals or radioactive nuclides, simple isolation, soil washing, electrokinetic remediation, immobilization and stabilization, plant purification and bioremediation, and among these, soil washing is widely used due to a relatively short time for restoration and excellent economic feasibility.

When washing is applied to purify contaminated soil, the most important factor to consider may be, a content of fine particles contained in soil. This is because the removal or separation efficiency of contaminants is low when soil having a high content of fine soil is washed, and solid-liquid separation after washing is very difficult. If a technique that can economically separate fine particles is developed and applied to a washing process, the capacity and treatment cost of a washing water treatment facility may be reduced, and the range of application of the soil washing technique may be widened as it can minimize the fine soil to be treated. Generally, a widely used soil particle size separation technique is sieving. There are dry and wet types in sieving, and a multi-stage vibrating screen that vibrates by a motor is mainly used, but there is a problem of screen damage or clogging. In addition, hydrocyclone technology that applies the sedimentation principle of centrifugal force is widely used for soil segregation, and unlike a centrifuge, due to the influence of centrifugal acceleration, suspended particles are separated from a fluid by only a vortex motion of the fluid itself. However, there is a disadvantage in that the separation efficiency may vary greatly depending on operating conditions such as the concentration of influent water, a pressure drop during operation and a lower effusion diameter.

The present invention provides a method of separating fine particles such as clay and silt in soil by magnetic separation using a cationic material-magnetic nanoparticle composite, as an economical and efficient method of separating contaminants such as heavy metals or radioactive nuclides selectively adsorbed to the fine particles of the clay and silt in soil.

PRIOR ART DOCUMENT (Patent Document) Korean Unexamined Patent Application No. 10-2013-0127415

DISCLOSURE

Technical Problem

The present invention provides a method and apparatus for separating contaminants (heavy metals or radioactive nuclides) selectively adsorbed to fine particles such as clay or silt in soil.

In addition, the present invention provides an adsorbent for removing a radioactive nuclide or heavy metal in fine soil such as clay or silt.

However, technical problems to be solved in the present invention are not limited to the above-described problems, and other problems which are not described herein will be fully understood by those of ordinary skill in the art from the following descriptions.

Technical Solution

The present invention provides a method of separating fine particles in soil, which includes: preparing a cationic magnetic nanoparticle composite by mixing magnetic nanoparticles and a cationic material (Step a); mixing the composite with contaminated soil so that the composite is bonded with fine particles containing clay or silt by electrostatic attraction (Step b); and performing magnetic separation or sequentially performing sieving and magnetic separation (Step c).

In addition, the present invention provides an adsorbent for removing a radioactive nuclide in fine soil, which includes a cationic magnetic nanoparticle composite in which magnetic nanoparticles are coated with a cationic material.

In addition, the present invention provides an adsorbent for removing a heavy metal in fine soil, which includes cationic magnetic nanoparticles in which magnetic nanoparticles are coated with a cationic material.

In addition, the present invention provides an apparatus for separating fine particles in contaminated soil, equipped with a magnetic part and a sieve, which includes a first separator divided into a first cell in which agitation is performed and a second cell having a magnetic part based on the sieve. The separator magnetically separates particles that have passed through the sieve in the contaminated soil mixed with cationic magnetic nanoparticles put into the first cell of the separator.

Advantageous Effects

According to the present invention, contaminants such as heavy metals or radioactive nuclides selectively or irreversibly adsorbed to fine particles (clay, silt, etc.) in soil can be economically and efficiently separated. Therefore, the present invention can be effectively used to restore soil in residential areas that are contaminated with radioactive nuclides in serious accidents such as the Fukushima Daiichi nuclear disaster as well as facility sites contaminated with heavy metals or radioactive nuclides. In addition, as contaminated soil waste can be treated only by the preparation of cationic magnetic nanoparticles and magnetic separation, secondary environmental contamination caused by the waste can be significantly reduced, and waste disposal costs can be reduced.

MODES OF THE INVENTION

Hereinafter, the present invention will be described in further detail with reference to exemplary embodiments. The objects, features and advantages of the present invention are easily understood through the following exemplary embodiments. The present invention is not limited to exemplary embodiments to be described below, but may be embodied in other forms. The exemplary embodiments presented herein are provided such that the idea of the present invention can be fully conveyed to those of ordinary skill in the art to which the present invention belongs. Therefore, the present invention should not be limited by the following exemplary embodiments.

Among soil components, fine particles (or fine soil) such as clay or silt are difficult to purify because heavy metals and radioactive nuclides are selectively and irreversibly combined therewith whereas soil having a large particle size such as sand and gravel generally has low pollution distribution and is relatively easy to purify. Accordingly, there is a need for technology to reduce an amount of soil waste by selectively separating highly-contaminated clay and silt accounting for approximately 10 to 30% of the contaminated soil.

Figure 1A:
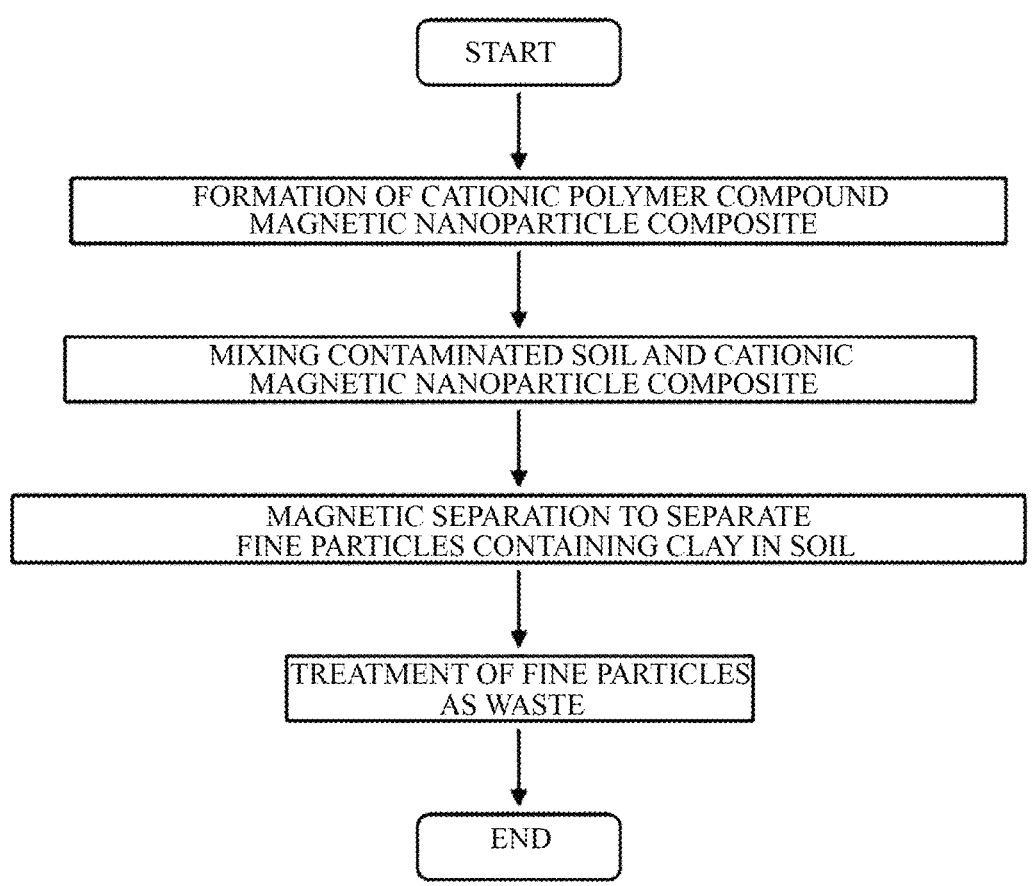
FIG. 1A and FIG. 1B show a flow chart illustrating a method of separating fine particles containing clay in contaminated soil using cationic magnetic nanoparticles.
Figure 1B:
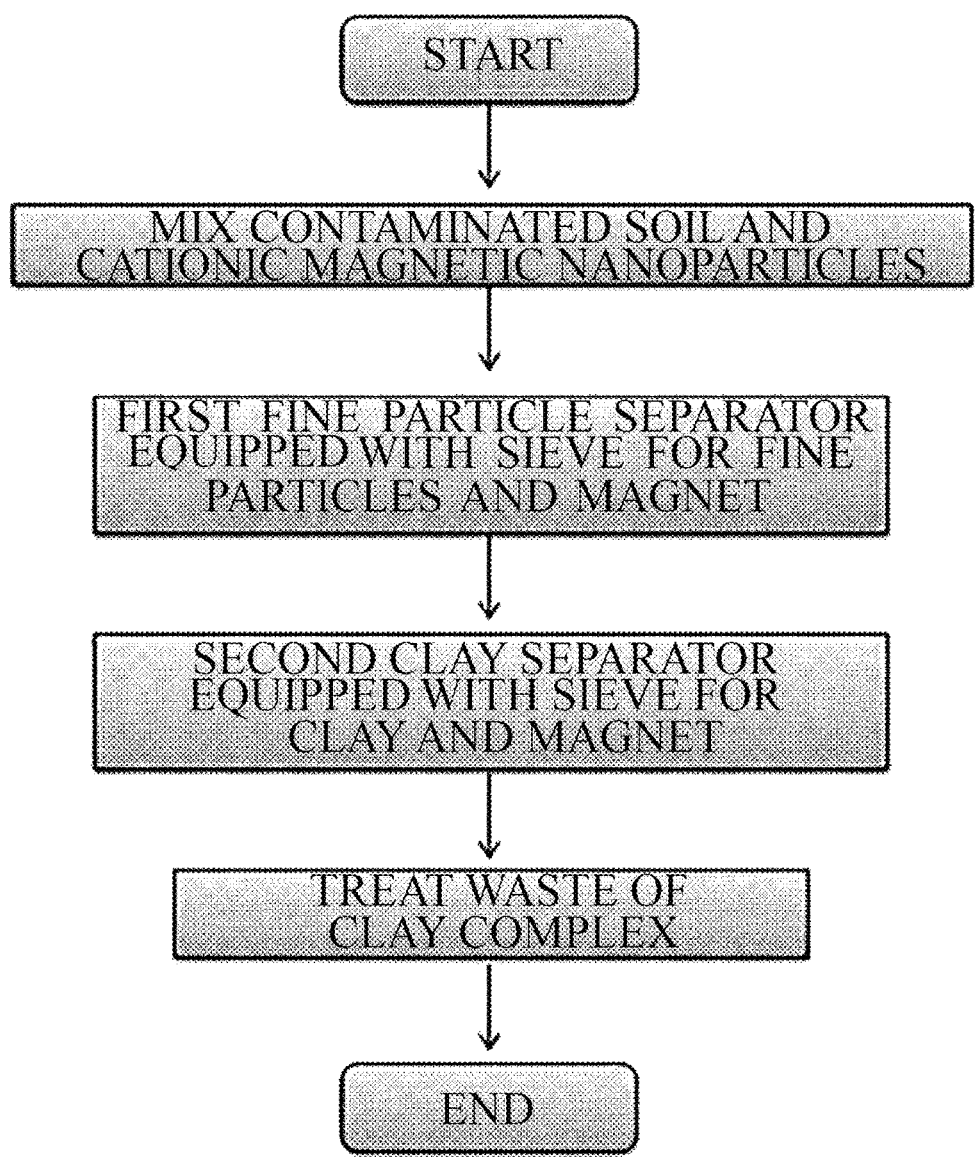
Figure 2:
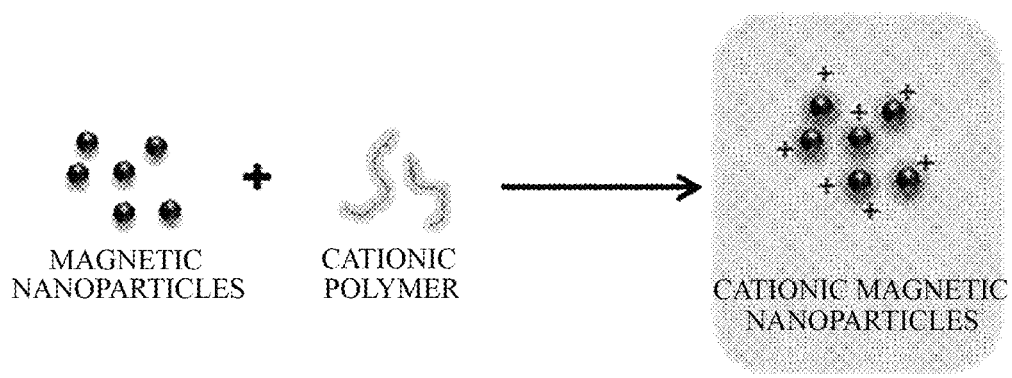
FIG. 2 schematically shows a process of forming cationic magnetic nanoparticles.
Figure 3:
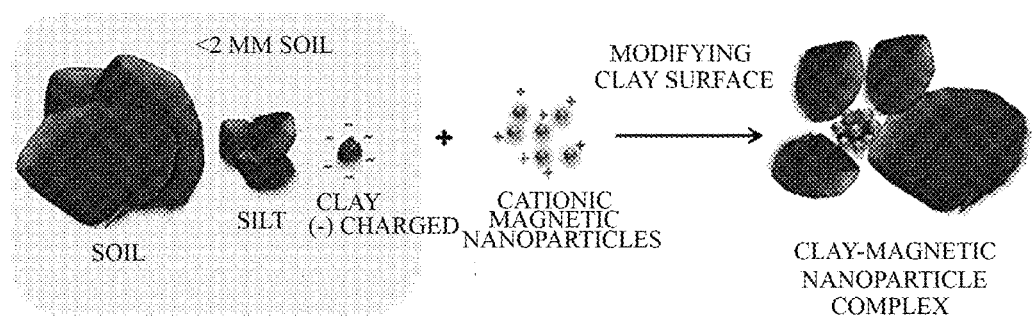
FIG. 3 schematically shows a process of selectively combining cationic magnetic nanoparticles with clay by electrostatic attraction.

Therefore, the present invention is directed to prepare a cationic material-coated magnetic nanoparticle composite to selectively separate clay and/or silt-sized fine particles to which contaminants such as heavy metals and/or radioactive nuclides are adsorbed in contaminated soil, and apply the composite to the contaminated soil. The cationic magnetic nanoparticle composite may be selectively adsorbed to fine particles containing clay which is negatively charged in soil through electrostatic attraction, and effectively separated through magnetic separation or sieving/magnetic separation to be treated as waste (see FIG. 1A and FIG. 1B).

Specifically, the present invention provides a method of separating fine particles in soil, which includes preparing a cationic magnetic nanoparticle composite by mixing magnetic nanoparticles and a cationic material (Step a); mixing the composite with contaminated soil so that the composite is bonded with fine particles containing clay or silt by electrostatic attraction (Step b); and performing magnetic separation or sequentially performing sieving and magnetic separation (Step c).

Through separation in Step c, magnetic particles may be separated. The separation method may further include treating magnetic fine particles separated by a magnetic force as waste.

Preparation of Cationic Material-Magnetic Nanoparticle Composite

The preparation of a cationic magnetic nanoparticle composite is a process of forming cationic material-coated nanoparticles by adsorbing a cationic material onto the surface of a magnetic nanoparticle. Magnetic nanoparticles (MNPs) refer to nanometer-size magnetic structures or materials. The MNPs may be prepared by co-precipitation, hydrothermal synthesis, solution synthesis or a sol-gel method. The MNPs may be iron oxide nanoparticles.

The cationic magnetic nanoparticle composite may be formed in a form in which the surface of a MNP is coated with a cationic material by mixing magnetic nanoparticles and cationic materials. Here, the cationic materials and the MNPs may be mixed in a ratio of cationic materials/MNPs (w/w)=0.01 to 1, and more preferably, 0.04 to 0.1. The cationic MNPs may be coated with cationic materials in the above-described ratio so that the total zeta potential may reach a desired range of 20 to 40 mV, and when the zeta potential exceeds the above range, there may be a problem in terms of economic feasibility.

The cationic nanoparticles according to the present invention may be effectively bonded with particulates in soil, which exhibit a negative charge of −50~−20 mV by controlling the zeta potential to 20 to 40 mV.

The cationic material may include one or more selected form the group consisting of polyethyleneimine (PEI), (poly (diallyldimethylammoniumchloride (PDDA) and (3-aminoproply)triethoxysilane (APTES). The cationic material may be a cationic polymer.

Mixing of Contaminated Soil and Cationic Magnetic Nanoparticles

Soil is classified into gravel, sand, silt and clay depending on a particle size, and generally, silt refers to particles of rocks or minerals having a particle size of 0.075 mm or less, and clay refers to those having a particle size of 0.002 mm or less. In addition, they basically include clay minerals based on the crystal structure of a mineral. Overall, the clay minerals exhibit a negative charge by substituting an atom having a high atomic value with a small atom in the lattice structure. Since the negative charge is present uniformly or non-uniformly on the clay surface, a zeta potential is in a range of −50 to −20 mV. Accordingly, when mixing the contaminated soil with the prepared cationic magnetic nanoparticles, the clay particles in soil are selectively bonded with cationic magnetic nanoparticles through electrostatic attraction. Here, the weight ratio of the cationic magnetic nanoparticles and fine particles (including clay and silt) is preferably 0.01:1 to 0.1:1.

The contaminated soil may include one or more of a heavy metal and a radioactive nuclide. The radioactive nuclide may include uranium ($UO_2^{2+}$), cesium ($Cs^+$) and cobalt ($Co^{2+}$).

Magnetic Separation to Separate Fine Particles including Clay in Soil

Figure 6:
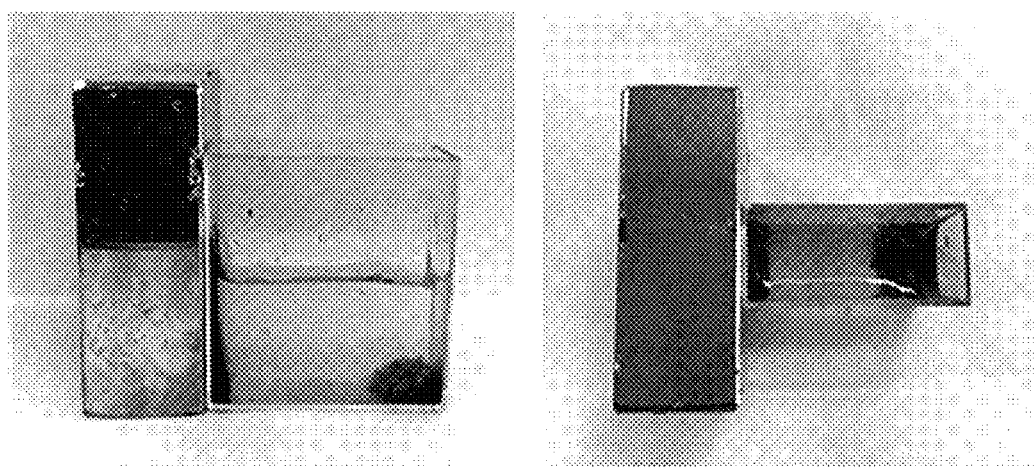
FIG. 6 is an image showing an experimental process for separating clay in soil using permanent magnet.

Subsequently, in the step of separating the clay-MNP complex by a magnetic force, only fine particles including clay given magnetism in soil may be separated through a wet magnetic separation technique. As a method suitable for a large-scale process, magnetic floating separation or magnetic drop separation using a drum-type magnetic device may be suggested. In addition, it was confirmed by an experiment that fine particles are selectively separated by a permanent magnetic (approximately −0.38 T) (FIG. 6).

Step of Sequentially Performing Sieving and Magnetic Separation

Step c may be performed by a separator divided into a first cell in which agitation is performed and a second cell having a magnetic unit based on a sieve. Among soil that underwent Step a and was then fed into the first cell of the separator, particles that have passed through the sieve may be separated by a magnetic force.

After the sieving and magnetic separation (first separation) are performed once, sieving and magnetic separation (second separation) may be further performed, and in this case, the mesh size of a sieve used in the second separation may be smaller than that used in the first separation.

Figure 4:
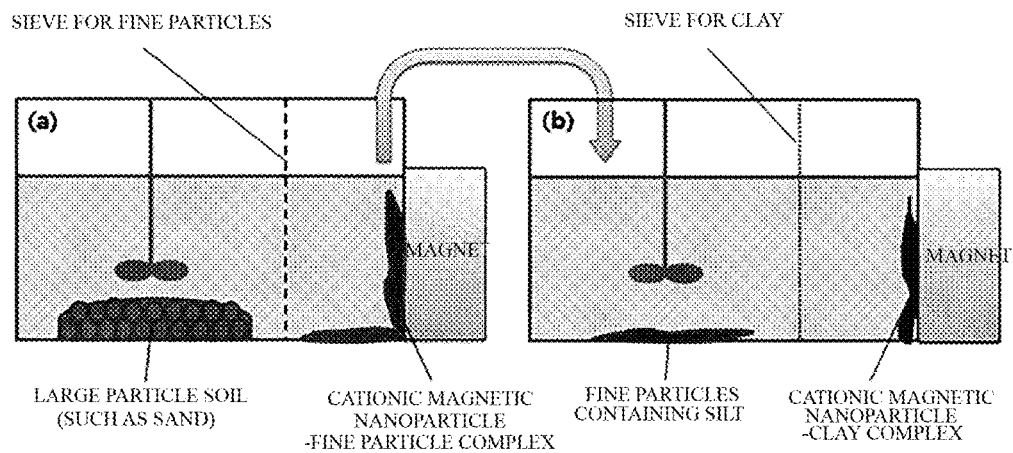
FIG. 4 is a schematic diagram of (a) a first separator (primary fine particle separator) in which a sieve for separating fine particles and a magnet are combined, and (b) a second separator (secondary clay separator) in which a sieve for separating clay particles and a magnet are combined.

Specifically, as shown in FIG. 4, first, a separator equipped with a sieve for fine particles (100 to 500 μm) may separate a cationic magnetic nanoparticles-fine particles complex, which passes through the sieve for fine particles, by a magnetic property. However, in this separation process, there may be particles that do not have a magnetic property but pass through a sieve for fine particles, and to separate smaller clay particles, additional selection by a second separator may be performed. The second separator for separating much smaller particles (clay, etc.) may be equipped with a sieve for clay (50 μm or less) so as to selectively separate smaller clay particles with a magnetic property.

Treatment of Fine Particles as Waste

Since fine particle waste separated by a magnetic force has a high contamination concentration, it may be treated as waste. Accordingly, through the method suggested above, it is possible to achieve volumetric reduction from the entire contaminated soil target to the high-concentration fine particle soil waste.

In addition, the present invention may provide an adsorbent for removing a radioactive nuclide or heavy metal in soil, which includes a composite of magnetic nanoparticles and cationic material-coated cationic magnetic nanoparticles. The zeta potential of the cationic magnetic nanoparticle composite may be 20 to 40 mV.

In addition, the present invention provides an apparatus for separating fine particles in contaminated soil, equipped with a magnetic part and a sieve. The separating apparatus may include a first separator divided into a first cell in which agitation is performed and a second cell having a magnetic part based on the sieve, and separate particles that have passed through the sieve in the contaminated soil mixed with cationic magnetic nanoparticles fed into the first cell of the separator.

The separating apparatus may further include a second separator divided into a first cell in which agitation is performed and a second cell having a magnetic part based on a sieve, and the mesh size of the sieve included in the second separator may be smaller than that of the sieve included in the first separator.

Hereinafter, the present invention will be described in further detail with reference to examples.

EXAMPLE 1

Preparation of Cationic Magnetic Nanoparticle Composite

For the preparation of a cationic polymer-coated magnetic nanoparticle composite, the paper written by Hu et al. (2014) was referenced. First, iron oxide nanoparticles were formed through coprecipitation in which iron ions (5 mM $FeCl_2$, 10 mM $FeCl_3$) and 10 mL of a hydrogen peroxide solution (25 wt %) were added to 100 mL DI water and reacted at 80° C. for 30 minutes. Subsequently, a cationic magnetic nanoparticle composite was prepared by mixing the iron oxide nanoparticles (MNPs) with a solution of polyethylenimine (PEI; (MW 12 kDa), which is a cationic polymer, in a ratio of 0.4:1 (PEI:MNP) at 90° C. for 1 hour.

Analysis of Clay Separating Ability of Cationic Magnetic Nanoparticle Composite

Figure 5:
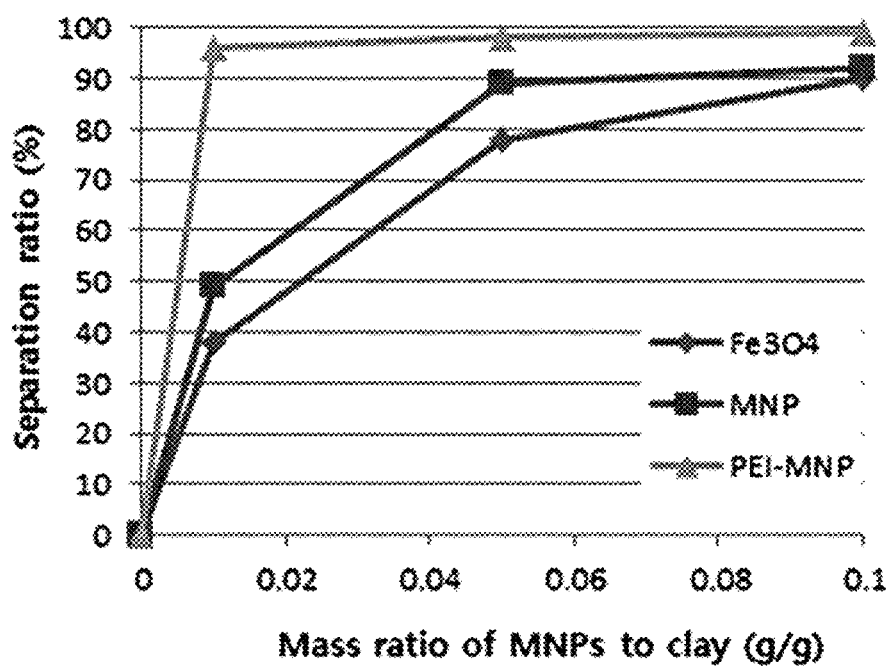
FIG. 5 shows a result of comparing separating ability according to a binding ratio between clay particles and magnetic nanoparticles.

This experiment was conducted to separate only a clay particle size from soil in which various sizes of particles, such as sand, silt, clay, etc., are mixed using the cationic magnetic nanoparticle composite. To confirm the selective separating ability of the cationic magnetic nanoparticles for clay in an aqueous solution, common commercialized iron oxide nanoparticles (Sigma-Aldrich, <50 nm) and magnetic nanoparticles which are not coated with PEI, prepared by coprecipitation, were prepared as controls. As a result of an experiment by changing the binding ratio (weight ratio) of the clay and the magnetic nanoparticles to 1:0.01, 1:0.05 or 1:0.1, PEI-MNP showed a separating ability of 90% or more at 1:0.01, and the magnetic nanoparticles having no cationic polymer showed a separating ability close to 90% at 1:0.1 (FIG. 5). That is, it was confirmed that the cationic polymer-coated magnetic nanoparticles have a higher selective separating ability for clay particles.

Analysis of Particle Size of Separated Particles

In a subsequent experiment, 1 g of soil (containing approximately 10% clay with d<20 nm) and 0.01 g of cationic magnetic nanoparticles (PEI-MNP) were mixed for approximately 1 hour to allow PEI-MNP to sufficiently bind to clay-containing fine particles. After the reaction, only fine particles obtaining a magnetic property were selectively and simply separated using a permanent magnet (0.38 T). As a result of analyzing the separated fine particles using a particle size analyzer, it was observed that particles having a size of approximately 5.7 to 6.8 μm (average 6.3 μm) are relatively evenly distributed, confirming that fine particles are selectively separated by a magnetic property.

Figure 7:
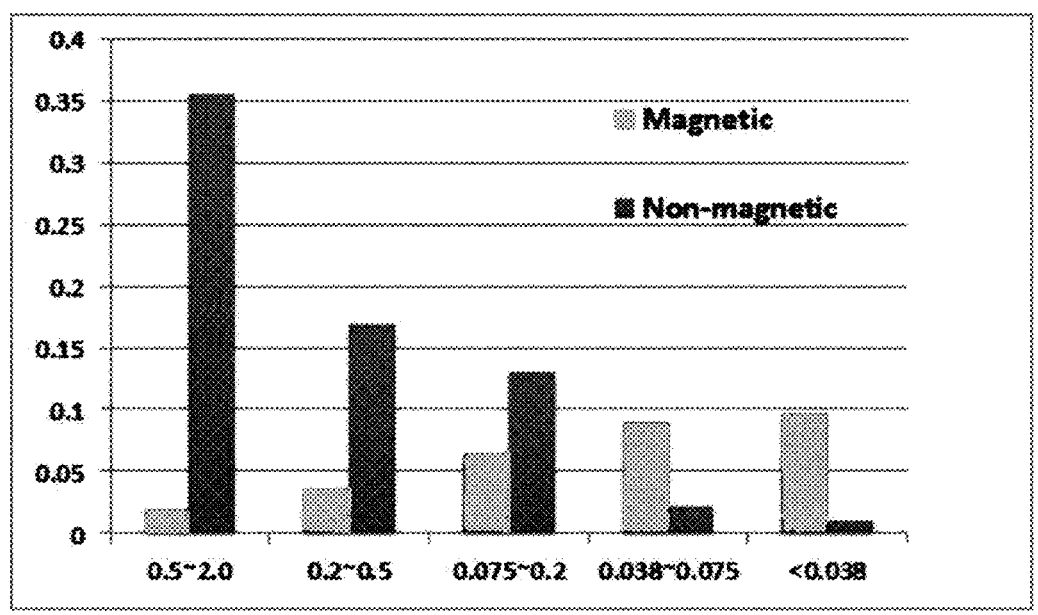
FIG. 7 is a particle size distribution chart of magnetic and non-magnetic parts after magnetic separation.

In an additionally-conducted experiment, PEI-MNP were mixed with soil composed of 40% of 0.5- to 2-mm particles, 20% of 0.2- to 0.5-mm particles, 20% of 0.075- to 0.2-mm particles, 10% of 0.038- to 0.075-mm particles, and 10% of 0.038-mm or less particles to be approximately 5% with respect to the total soil, and then a magnetic portion and a non-magnetic portion were separated using a permanent magnet. The separated magnetic or non-magnetic soil was subjected to wet sieving to confirm particle size distribution as shown in Figure below. Referring to FIG. 7, it was confirmed that 0.075-mm or less silt- and clay-sized particles are mostly contained in soil separated by magnetic selection, and 0.075-mm or more sand-sized particles are separated as non-magnetic soil. This demonstrated that magnetic separation of fine particles using cationic magnetic nanoparticles is effectively applied even in a general soil ratio (FIG. 7).

EXAMPLE 2

Preparation of Cationic Magnetic Nanoparticle Composite

Figure 8:
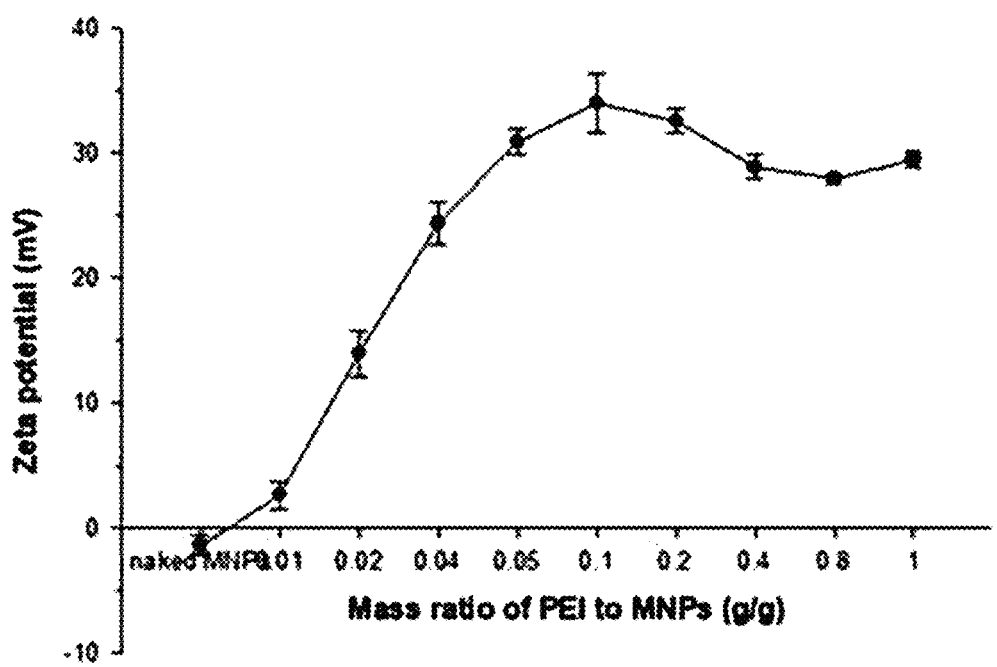
FIG. 8 is a graph showing the result of analyzing a change in zeta potential value according to a ratio of a cationic polymer (PEI) and magnetic nanoparticles (MNPs).

For the preparation of a cationic magnetic nanoparticle composite in which magnetic nanoparticles are coated with a cationic polymer, the paper written by Hu et al. (2014) was referenced. First, iron oxide nanoparticles were formed through coprecipitation in which iron ions (5 mM $FeCl_2$, 10 mM $FeCl_3$) and 10 mL of a hydrogen peroxide solution (25 wt %) were added to 100 mL DI water and reacted at 80° C. for 30 minutes. Subsequently, a cationic magnetic nanoparticle composite was prepared by mixing the iron oxide nanoparticles (MNPs) with a solution of PEI (MW 12 kDa), which is a cationic polymer, at various ratios (weight ratio, g:g) at 90° C. for 1 hour. As a result of analyzing the zeta potential of the prepared cationic magnetic nanoparticles, it was confirmed that the highest value is shown at 0.1:1 (gPEI:gMNP) (FIG. 8).

Analysis of Clay Separating Ability of Cationic Magnetic Nanoparticle Composite

This experiment was conducted to analyze the clay separating ability of cationic magnetic nanoparticles using the cationic magnetic nanoparticles prepared in a ratio of 0.1:1 (gPEI:gMNP). To confirm the selective separating ability of the cationic magnetic nanoparticles for clay in an aqueous solution, common commercialized iron oxide nanoparticles (Sigma-Aldrich, <50 nm) and magnetic nanoparticles which are not coated with PEI, prepared by coprecipitation, were prepared as controls. As a result of an experiment by changing the binding ratio (weight ratio) of the clay and the magnetic nanoparticles to 1:0.01, 1:0.05 or 1:0.1, a separating ability of 90% or more was shown at 1:0.01, and the magnetic nanoparticles having no cationic polymer showed a separating ability close to 90% at 1:0.1. That is, it was confirmed that the cationic polymer-coated magnetic nanoparticles have a higher selective separating ability for clay particles.

First Separation (Fine Particle Separation)

Figure 9A:
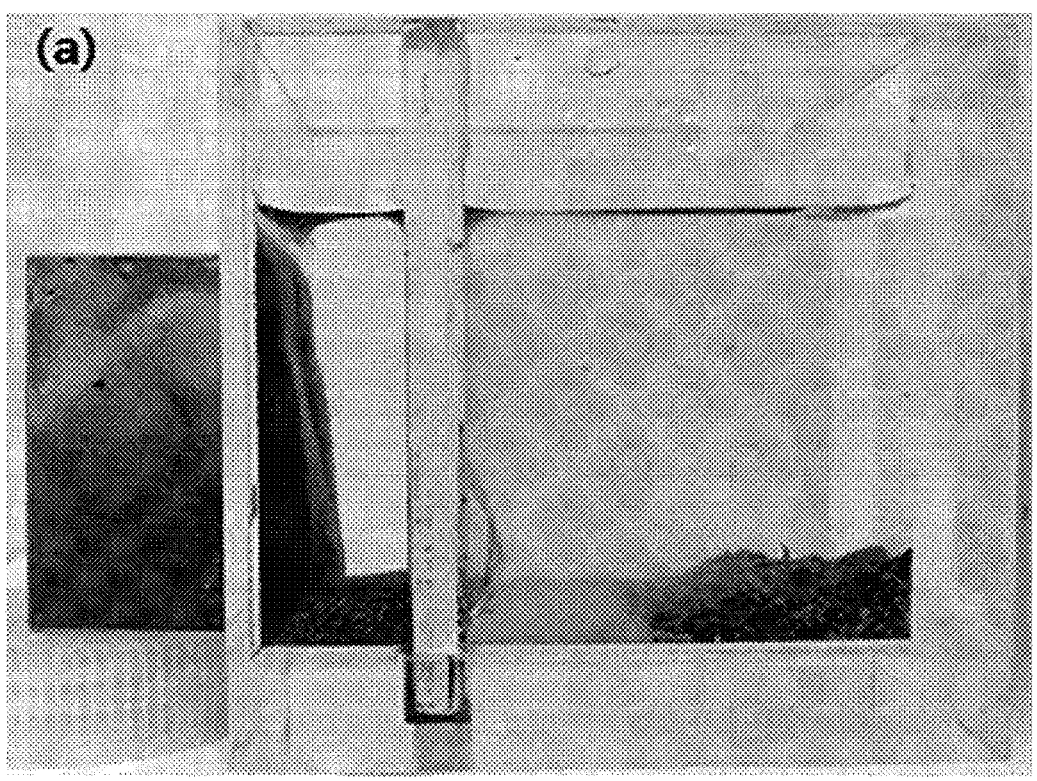
FIG. 9A is an image of the process of separating fine particles using a sieve (500 μm) for separating fine particles and a magnetic force.
Figure 9B:
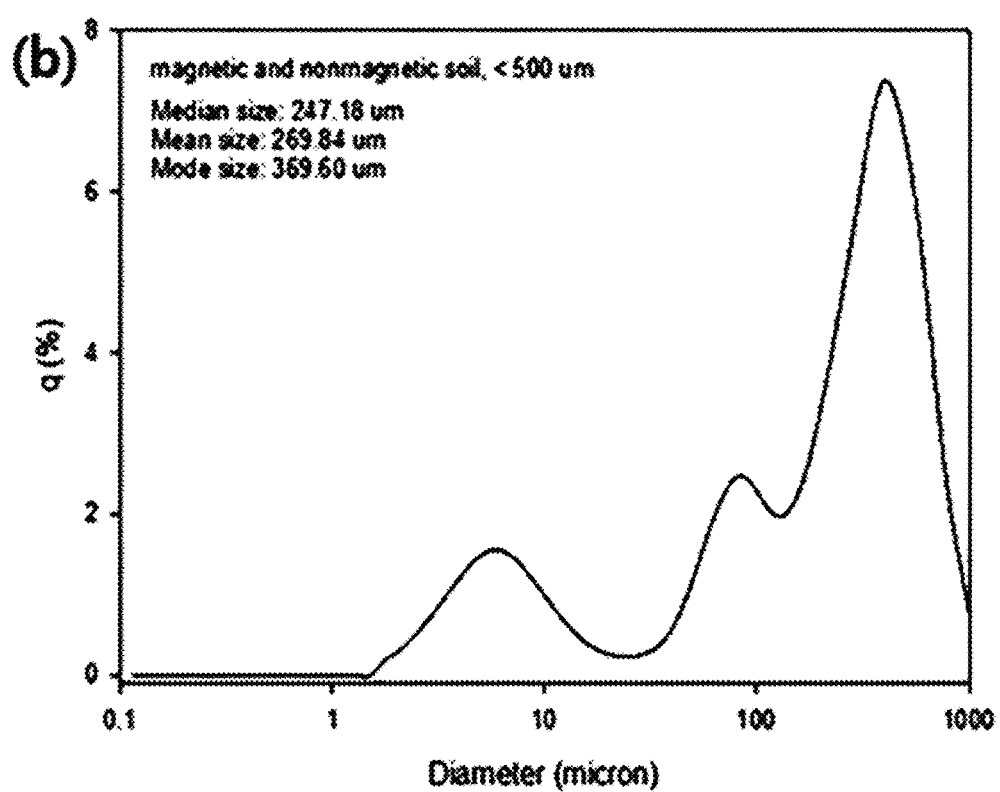
FIG. 9B is a graph showing the result of analyzing particle size distribution of the separated fine particles.

1.25 g of the cationic magnetic nanoparticles (PEI-MNP) prepared in a ratio of 0.1:1 (gPEI:gMNP) were mixed with 25 g of soil (containing 60% sand, 30% silt and 10% clay) in a ratio of approximately 0.05:1 for approximately 1 hour to allow the PEI-MNP to sufficiently bind to fine particles. After the reaction, as shown in FIG. 9A, first, by a separating apparatus equipped with a permanent magnet (0.38 T) and a 500-μm mesh-sized sieve, fine particles having a magnetic property could be selectively and simply separated. As a result of analyzing the separated fine particles using a particle size analyzer, it was observed that particles having an average diameter of approximately 270 μm are distributed, confirming that fine particles having a diameter of 500 μm or less are selectively separated by a magnetic force and a sieve (FIG. 9B).

Second Separation (Clay Separation)

Figure 10A:
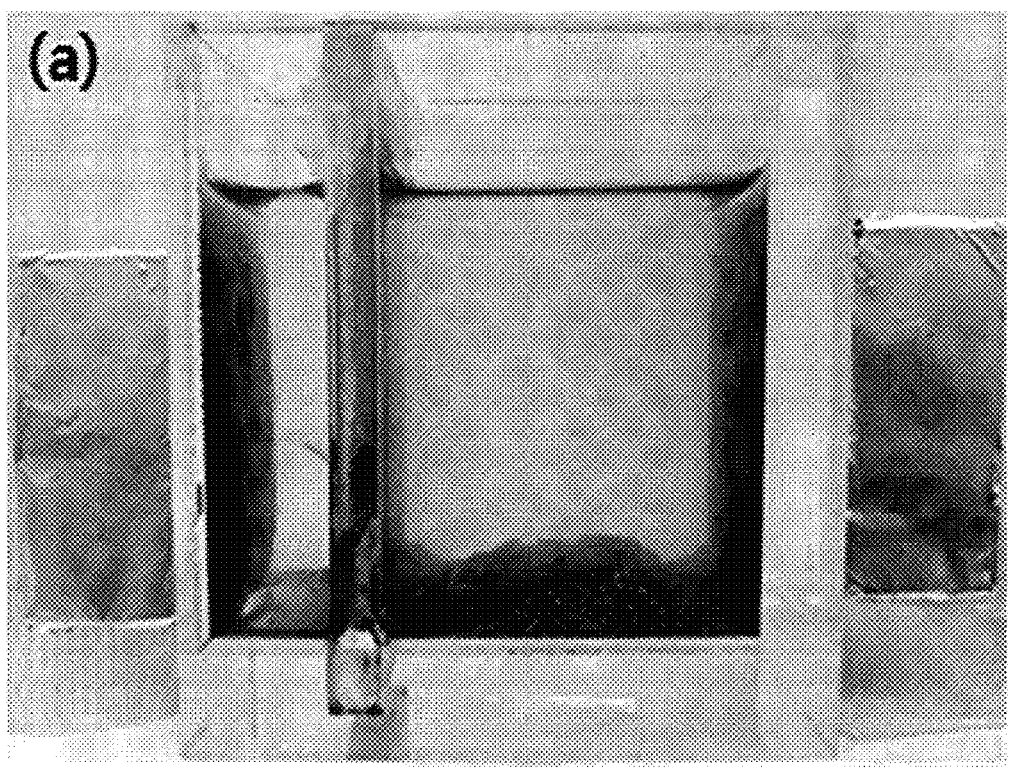
FIG. 10A is an image showing the process of separating clay particles using a sieve (38 μm) for separating clay particles and a magnetic force.
Figure 10B:
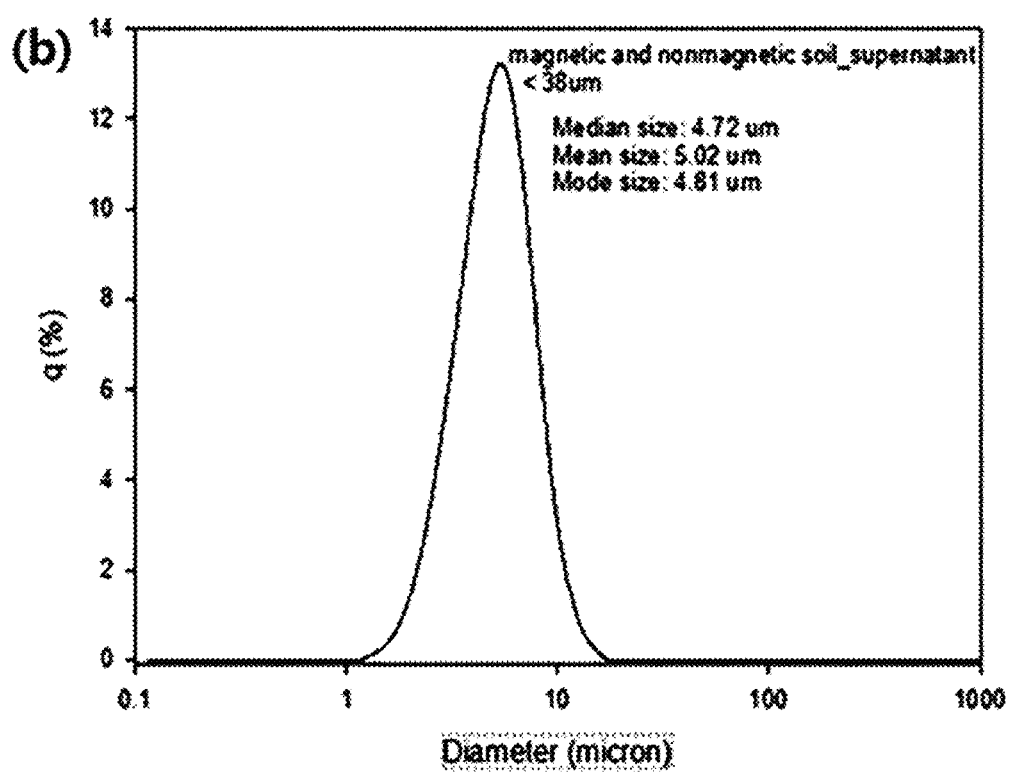
FIG. 10B is a graph showing the result of analyzing particle size distribution of the separated clay particles.

After the first separation, secondly, as a result of separating the fine particles separated as described above using a sieve for clay separation (38 μm) and a magnetic force, as shown in FIG. 10A, it was confirmed that only silt or less-sized clay with a magnetic property is effectively separated, and as a result of the particle size analysis of the separated clay, it was also confirmed that particles having an average diameter of approximately 5 μm are evenly distributed (FIG. 10B).

It should be understood by those of ordinary skill in the art that the above description of the present invention is exemplary, and the exemplary embodiments disclosed herein can be easily modified into other specific forms without departing from the technical spirit or essential features of the present invention. Therefore, the exemplary embodiments described above should be interpreted as illustrative and not limited in any aspect.

The invention claimed is:

1. A method of separating fine particles in soil, comprising:
   preparing a cationic magnetic nanoparticle composite by mixing magnetic nanoparticles and a cationic material (Step a);
   mixing the composite with a contaminated soil so that the composite is bonded with fine particles containing clay or silt by electrostatic attraction (Step b); and
   performing magnetic separation or sequentially performing sieving and magnetic separation (Step c).

2. The method of claim 1, wherein the magnetic nanoparticles are prepared by coprecipitation method.

3. The method of claim 1, wherein the magnetic nanoparticles are iron oxide nanoparticles.

4. The method of claim 1, wherein the cationic material comprises one or more selected from the group consisting of polyethyleneimine, poly(diallyldimethylammoniumchloride) and (3-aminopropyl)triethoxysilane.

5. The method of claim 1, wherein the cationic material and the magnetic nanoparticles are mixed in a ratio of cationic material/magnetic nanoparticle (w/w) of 0.01 to 1.

6. The method of claim 1, wherein the contaminated soil contains one or more selected from the group consisting of a heavy metal and a radioactive nuclide.

7. The method of claim 1, wherein in Step c, the sieving and the magnetic separation are sequentially performed by a separator divided into a first cell in which agitation is performed and a second cell having a magnetic part based on a sieve, and particles passing through the sieve in the contaminated soil that underwent Step b, fed into the first cell, are separated by a magnetic force.

8. The method of claim 1, further comprising:
   in Step c, after the sequential performance of sieving and magnetic separation (first separation), additionally performing sieving and magnetic separation (second separation),
   wherein a mesh size of the sieve used in the second separation is smaller than that used in the first separation.

9. The method of claim 1, further comprising:
   after Step c, treating magnetic particles separated by a magnetic force as waste.

* * * * *